United States Patent [19]

Butcher et al.

[11] Patent Number: 5,412,270
[45] Date of Patent: May 2, 1995

[54] MOTOR ASSEMBLY WITH MOUNTING ARRANGEMENT

[75] Inventors: James A. Butcher; Michael A. Pitzer, both of Fort Wayne, Ind.

[73] Assignee: General Electric Company, Fort Wayne, Ind.

[21] Appl. No.: 13,698

[22] Filed: Feb. 4, 1993

[51] Int. Cl.$^6$ ........................................... H02K 11/00
[52] U.S. Cl. ................................. 310/68 R; 310/91
[58] Field of Search ................. 310/68 R, 68 A, 68 C, 310/68 E, 71, 89, 91

[56] References Cited

U.S. PATENT DOCUMENTS

| | | | |
|---|---|---|---|
| Re. 31,525 | 2/1984 | Boyd, Jr. et al. | 310/91 |
| 2,974,186 | 3/1961 | Klumpp, Jr. | 248/56 |
| 3,123,662 | 3/1964 | Fink | 310/71 |
| 3,366,356 | 1/1968 | Fisher | 248/56 |
| 3,502,917 | 3/1970 | Bizoe | 310/71 |
| 4,289,923 | 9/1981 | Ebert | 310/71 |
| 4,729,534 | 3/1988 | Hill et al. | 248/56 |
| 4,856,182 | 8/1989 | Fisher et al. | 29/622 |
| 4,922,604 | 5/1990 | Marshall et al. | 310/90 |
| 5,101,129 | 3/1992 | Butcher | 310/68 C |
| 5,175,458 | 12/1992 | Lemmer et al. | 310/71 |

Primary Examiner—R. Skudy
Assistant Examiner—Matthew Nguyen
Attorney, Agent, or Firm—Ralph E. Krisher, Jr.

[57] ABSTRACT

An electric motor assembly has a motor housing, a stator mounted in the housing, a rotor rotatably mounted in the housing and disposed adjacent the stator, a pair of end shields mounted adjacent opposing ends of the motor housing having bearings disposed therein for rotatably supporting the rotor, a mounting bracket disposed in the housing, and a motor control component mounted in the bracket. The bracket has a one-piece, resilient body that is elastically deformable from a relaxed position to an expanded position, an engaging structure mounted on opposing portions of the body to secure the motor control component to the body, and a mounting structure that mounts the body in the housing. The bracket is mounted in the housing so that a surface thereof is disposed adjacent and interacts with an inner surface of the housing to prevent deformation of the bracket, thereby locking the component to the bracket.

33 Claims, 3 Drawing Sheets

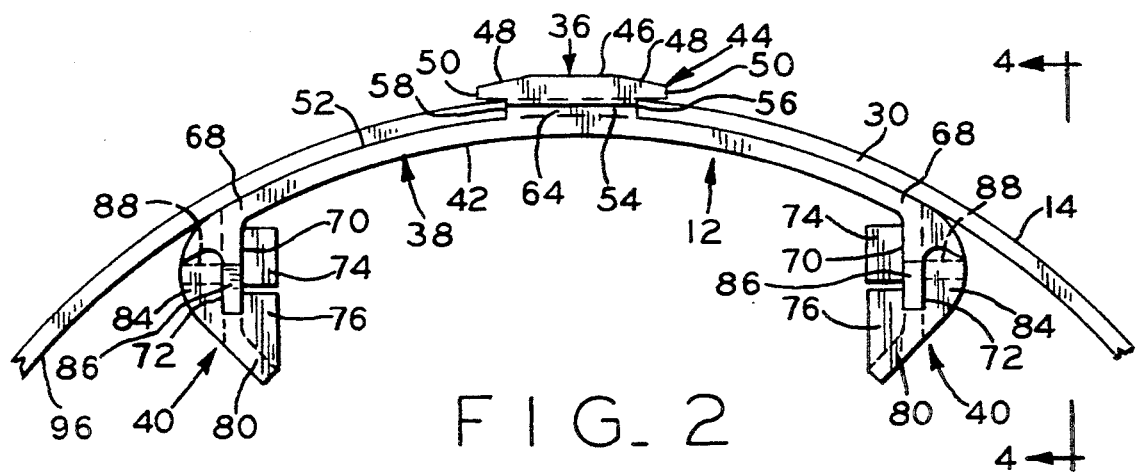
FIG_2
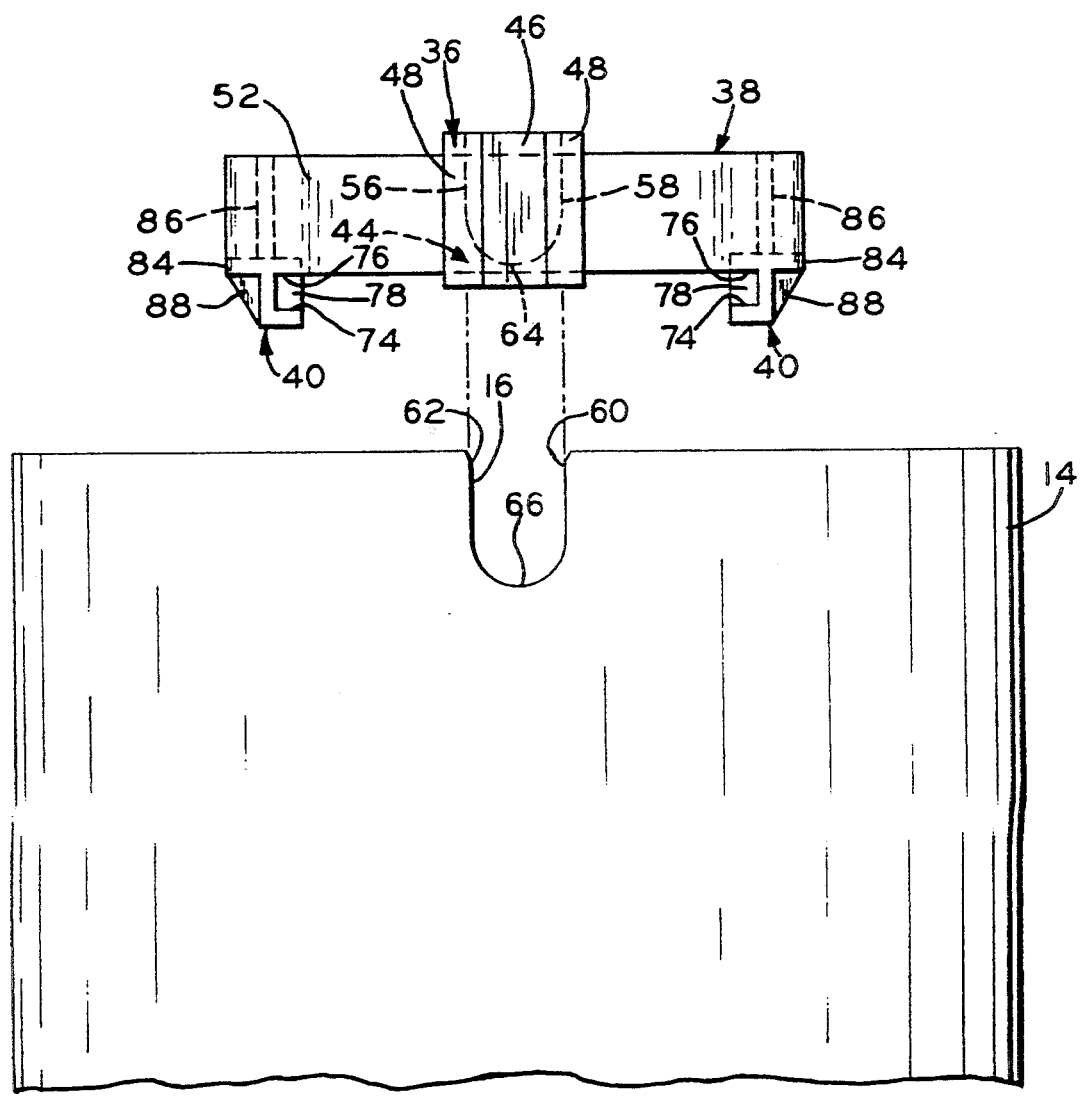
FIG_3

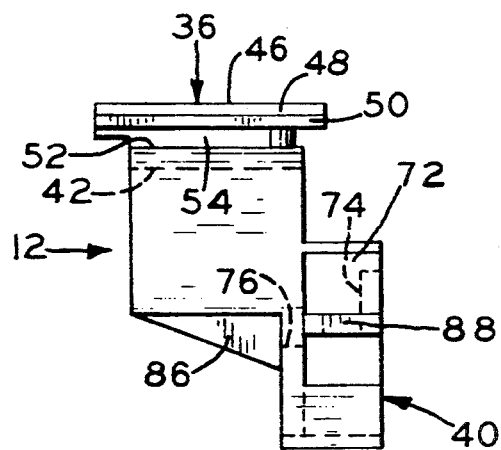
FIG_4
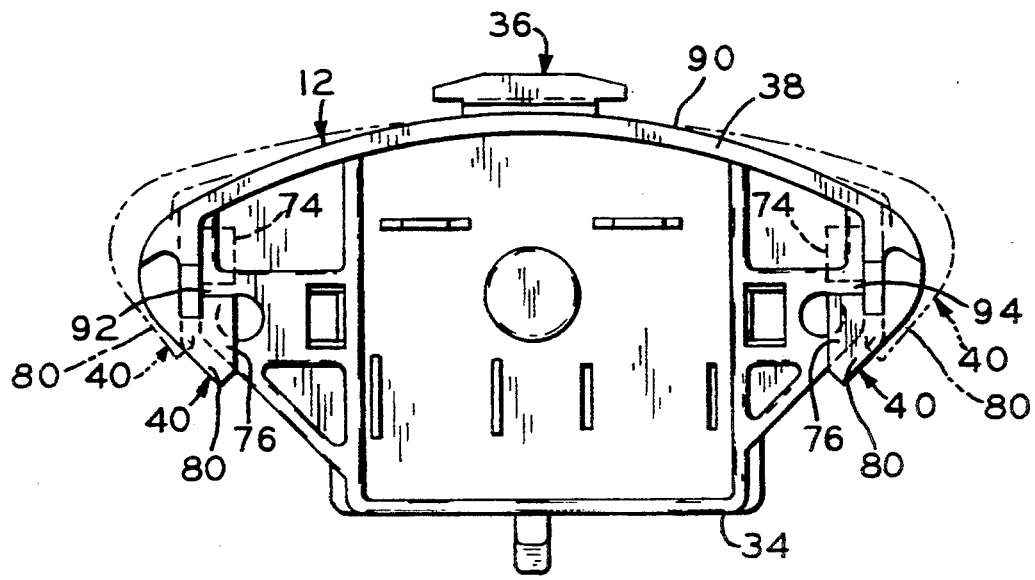
FIG_5

MOTOR ASSEMBLY WITH MOUNTING ARRANGEMENT

BACKGROUND AND SUMMARY OF THE INVENTION

The present invention relates generally to an electric motor assembly and, more particularly, to an electric motor assembly which includes apparatus for mounting a motor control component in the housing of a motor. In one embodiment, a motor assembly includes a one-piece, elastically-resilient mounting apparatus. The mounting apparatus engages at least a portion of a motor control component such that when the apparatus and control component are placed in the motor housing, an outer surface of the mounting apparatus cooperates with an inner surface of the motor housing to ensure that the control component remains locked in the mounting apparatus during motor operation.

Electric motors are manufactured in a variety of types and configurations. The basic components of an induction motor include a stator, an armature or rotor, a shaft, a pair of bearings, end shields, and a motor housing. In addition to these primary motor components, some types and configurations of induction motors include electrical or electronic components which are used to modify operating characteristics for particular applications. Examples of such motors are resistance start, reactor start, capacitor start, permanent split capacitor, and capacitor start-capacitor run motors. These different types of motors are characterized by different speed-torque characteristics, and may be designed to provide different theoretical maximum efficiencies.

For some applications, particularly those where high starting torque is required, part of the windings in a motor may be designed and arranged to serve as auxiliary or starting windings which are energized during initial excitation of the motor, but which are de-energized as the motor comes up to a predetermined speed. De-energization of such windings is often accomplished by a centrifugal switch, or other appropriate device.

In some applications, capacitors, speed control switches, voltage control switches, overload devices, and other electrical components are mounted inside the motor housing with screws to either the motor end flange or to brackets welded inside the motor housing. These mounting methods require the use of either steel brackets welded to the shell with screws used to mount the control device within the brackets, or screws connecting the control device to a separately cast or formed end shield that itself is mounted to the motor housing.

These presently known methods are labor intensive in that both require either welding inside the shell housing or separate casting of a motor end flange to which control components are attached. Furthermore, if a differently-sized component needs to be mounted where a previous component was placed, either the motor housing or the end flange may need to be replaced. A new arrangement for mounting motor control components that eliminates the need for either brackets that are welded in the motor housing or the casting of separate end flanges would be a welcome improvement. A mounting arrangement which reduces the number of parts and the labor associated with mounting motor control components within the motor housing would reduce the total cost of the motor assembly. It is an object of the present invention to provide such an improved mounting arrangement and less costly motor assembly.

According to the present invention, a bracket for mounting a control component in a motor housing is provided. In one embodiment, the bracket includes a one-piece resilient body, elastically movable between a relaxed position and an expanded position and an engaging structure disposed on the body for engaging the control component when the body is in the relaxed position to secure the control component. The engaging structure at least partially disengages the component in the expanded position to allow the component and the body to be separated. The bracket also includes a mounting structure for securing the body to the motor housing such that a surface of the bracket is disposed adjacent and interacts with an inner surface of the housing to prevent deformation of the bracket body thereby locking the component to the bracket.

The one-piece resilient body may be arcuately-shaped and has a top surface and a bottom surface, the body being deformable from the relaxed position to the expanded position. The body is preferably injection-molded from plastic that is thick enough to resist stress fractures caused during flexing from the relaxed position to the expanded position.

The engaging structure is mounted on opposing portions of the body so as to extend in the same direction from the bottom surface thereof. The engaging structure has interior and exterior surfaces that are parallel to one another. Laterally spaced tabs orthogonally extend from the interior surface of the engaging structure so as to define a space into which portions of the control component fit. These tabs may also be diagonally offset. Support surfaces extend from the interior surface of the engaging structure to limit movement of the control component in at least one direction. In one embodiment, the tabs are diagonally offset with one of the tabs being mounted to a portion of the support surface.

The mounting structure includes a flange that is mounted on the top surface of the body. The flange fits into a slot formed in the motor housing. This mounting ensures that the top surface of the body interacts with the inner surface of the housing to prevent deformation of the body to lock the control component within the bracket.

The bracket may also include gussets mounted between the engaging structure and the bottom surface of the body to reduce wobbling of the control component mounted in the bracket. Gussets may also be mounted between the engaging structure and the body, at opposing portions of the body where the engaging structure is attached, to provide strength to the point where the engaging structure is mounted to the body. Finally, gussets may be mounted to the exterior surface of the engaging structure to provide strength thereto when engaging at least a portion of the control component.

The bracket of the present invention may also be molded from thermoplastic so that all the surfaces thereof are all visible from at least one set of two-dimensional perspectives, the set including two different two-dimensional views of the bracket. This allows the bracket to be cast using only two molds, with no mold inserts or subsequent molding or machining steps being required. Thus, tooling expenses associated with the manufacturing process are reduced.

Other objects, advantages and novel features of the present invention will become apparent from the following detailed description of the invention when considered in conjunction with the accompanying drawings.

BRIEF DESCRIPTION OF THE DRAWINGS

FIG. 2 is a front elevational view of the mounting bracket shown in FIG. 1 mounted in a motor housing.

FIG. 3 is a top view of the bracket of the present invention prior to mounting in a housing of a motor.

FIG. 4 is a side elevational view of the bracket of the present invention taken along line 4—4 of FIG. 2.

FIG. 5 shows a centrifugal start switch mounted in the mounting bracket constructed in accordance with the present invention.

DETAILED DESCRIPTION OF THE DRAWINGS

Figure 1:
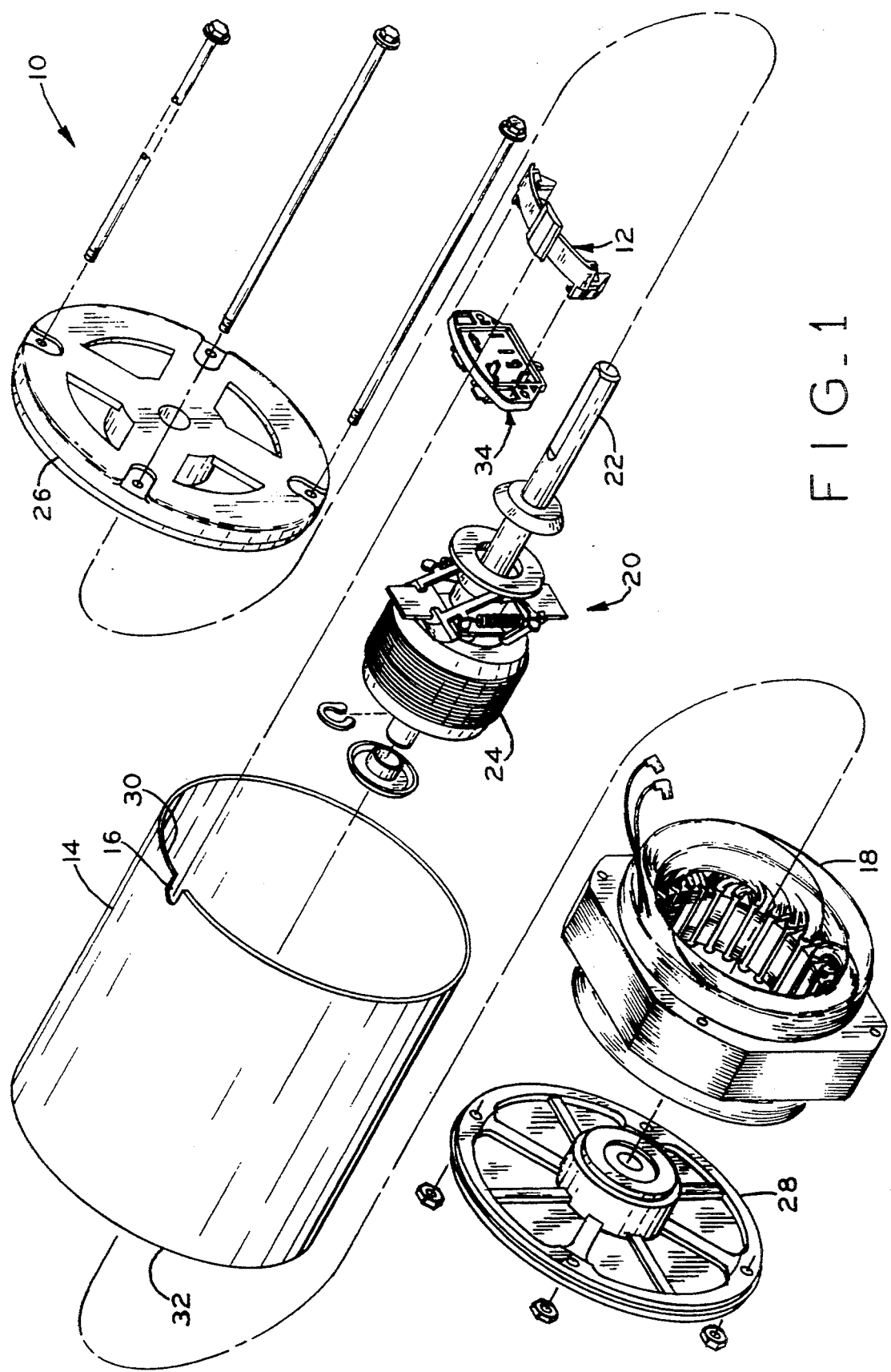
FIG. 1 is an exploded view of a motor assembly and a mounting bracket constructed in accordance with the present invention.

FIG. 1 shows an exploded view of an induction motor assembly 10 and a mounting bracket 12 of the present invention. Motor assembly 10 includes a housing 14 having a slot 16 formed therein, a stator 18 that is mounted in the housing, a rotor assembly 20 having a shaft 22 and a core 24 having bearings (not shown) disposed therein for rotatably supporting shaft 22, and a motor control component 34.

One embodiment of mounting bracket 12 of the present invention is shown in FIG. 2. Bracket 12 includes a mounting structure 36, an arcuately-shaped body 38 that is resilient and elastically movable between a relaxed position and an expanded position (discussed with more particularity with regard to FIG. 5), and engagement structures 40 on opposing ends of arcuately-shaped body 38 and extending from a bottom surface 42 thereof.

Mounting structure 36 includes a flange 44 integrally molded with arcuately-shaped body 38. Flange 44 has a "rooftop" profile delineated by flat portion 46 and angled portions 48. A ledge 50 is formed on either side of flange 44 as a result of flange 44 being raised from top surface 52 of body 38 via raised portion 54 so as to form recessed portions 56 and 58 on either side of raised portion 54.

As can be seen in FIG. 3, flange 44 is inserted into slot 16 (shown as a U-shaped outline) of motor housing 14 so that edges of recessed portions 56 and 58 (see FIG. 2) engage edge portions 60 and 62 of slot 16 shown in FIG. 3. Insertion of flange 44 is controlled by a stop surface 64 (see FIG. 2) that limits the depth of insertion of bracket 12 in motor housing 14 when stop surface 64 comes in contact with the end portion 66 of slot 16 (see FIG. 3). Angled portions 48 of flange 44 overlap slot 16 when mounting bracket 12 is inserted therein. This overlap helps prevent entry of dirt and moisture into the motor compartment.

FIG. 2 also shows engagement structures 40 on opposing ends of body 38. Engagement structures 40 have interior surfaces 70 and exterior surfaces 72. Laterally spaced tabs 74 and 76 orthogonally extend from interior surfaces 70 so as to form spaces 78 into which portions of motor control component 34 can be inserted to lock component 34 in place (see FIG. 3). In one embodiment, the laterally-spaced tabs are also diagonally offset.

FIG. 2 further shows support surfaces 80 mounted to or formed on each of the opposing engagement structures 40 and angularly extending towards one another.

Support surfaces 80 limit the movement of control component 34 in at least one direction while in the bracket to help ensure that it remains fixed therein. Tabs 76 are shown as being mounted on a portion of support surfaces 80. Extending tabs 76 onto support surfaces 80 lengthens each of spaces 78 to allow engagement structures 40 to grip a larger portion of control component 34.

Gussets 84 are shown in FIGS. 2 and 3 connected between arcuately-shaped body 38 and exterior surfaces 72 of engagement structures 40. Gussets 84 provide strength at connecting points 68 where engagement structures 40 are mounted to or formed on body 38.

FIG. 4 shows gusset 86 extending between bottom surface 42 (also shown in FIG. 2) of arcuately-shaped body 38 and engagement structure 40. An identical gusset 86 is provided on opposing portion of body 38. Gusset 86 provides stability to bracket 12 to reduce wobbling of control component 34 mounted therein during motor operation.

Also shown in FIG. 4, as well as FIGS. 2 and 3, is gusset 88 that orthogonally projects from exterior surface 72 of engagement structure 40. Gusset 88 is also provided on the opposing engagement structure 40. These gussets provide strength to engagement structures 40 when engaging control component 34.

FIG. 5 shows bracket 12 engaging control component 34. As can be seen, when arcuately-shaped body 38 is in the relaxed position, its shape conforms with the top portion 90 of control component 34 (shown in FIG. 5 as being flush with top surface 52 of body 38) that fits therein. Tabs 74 and 76 as well as support surfaces 80 are also shown engaging respective back, front, and bottom surfaces of edge portions 92 and 94 of control component 34. FIG. 5 also shows in outline the flexing of bracket 12 to an expanded position that allows for the insertion of motor control component 34 therein.

In the illustrated embodiment, bracket 12 is molded entirely from plastic. The embodiment is constructed so as to allow all the surfaces of bracket 12 to be seen from at least one set of two-dimensional perspectives, the set including two different two-dimensional views of the bracket. This means that bracket 12 may be cast using two opposing molds without the aid of mold inserts or subsequent forming operations. Use of only two molds aids in the manufacturing process by reducing tooling expense and production time.

In operation, with reference to FIGS. 2, 3, and 5, control component 34 is inserted into one of the two engagement structures 40 so that an edge portion 92 of control component 34 is disposed in space 78 formed between laterally spaced tabs 74 and 76. The opposing edge portion 94 of control component 34 is disposed in the other space 78 of opposing engagement structure 40. It is understood that the order of insertion of edge portions 92 and 94 into engagement structures 40 can be reversed. During insertion of control component 34, arcuate body 38 is elastically deformed from the relaxed position to an expanded position shown in dashed lines in FIG. 5 to allow entry of the opposing edge portion 94 of control component 34 into space 78 of engagement structure 40. Arcuately-shaped body 38 then flexes back to the relaxed position after the opposing edge portion 94 of control component 34 has been secured in space 78. Bracket 12 is then placed in motor housing 14 so that flange 44 engages slot 16. When mounted in housing 14, top surface 52 of arcuately-shaped body 38 interacts with inner surface 96 of housing 14 to prevent subsequent deformation of bracket 12 into the expanded position, thereby locking control component 34 to bracket 12.

Although the above description makes reference to an induction motor assembly 10, it is to be understood that mounting bracket 12 of the present invention can be used with other types of motors (e.g., direct current motors) as well.

From the preceding description of the illustrated embodiment, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. An electric motor assembly, comprising:
   a motor housing;
   a stator mounted in the housing;
   a rotor rotatably mounted in the housing and disposed adjacent the stator;
   a pair of end shields mounted adjacent opposing ends of the motor housing having bearings disposed therein for rotatably supporting the rotor;
   a motor control component;
   a bracket for mounting the control component in the motor housing, said bracket comprising a one-piece resilient body, elastically deformable from a first position to a second position, and having means oppositely disposed on the body for engaging the control component to secure the control component to the body when the body is in the first position, said means at least partially disengaging the component when the body is deformed to the second position so as to allow the component to be separated from the body; and
   means for mounting the bracket to the housing such that a top surface of the body is disposed adjacent and interacts with an inner surface of the housing to prevent deformation of the body thereby locking the component to the bracket.

2. An electric motor assembly of claim 1, wherein the top surface of the body and the inner surface of the housing are arcuately shaped and have approximately equal radii of curvature.

3. An electric motor assembly of claim 1, wherein the means for mounting the bracket to the housing comprises a flange on the body of the bracket, said flange engaging a slot formed in an edge of the motor housing.

4. An electric motor assembly of claim 3, wherein said body of the bracket is molded from a thermoplastic material, and wherein said flange is integrally molded with the body.

5. An electric motor assembly of claim 1, wherein said bracket further comprises at least one integrally molded gusset extending between the body and the engaging means to reduce relative movements of the body and the engaging means.

6. An electric motor assembly of claim 1, wherein each of said oppositely disposed means for engaging the control component comprises at least two tabs that define a space which receives a portion of the control component when the body is in the first position.

7. An electric motor assembly of claim 6, wherein the tabs are diagonally offset.

8. A bracket for mounting a control component in a motor housing, comprising:

a resilient, arcuately-shaped, one-piece body, having a top surface and a bottom surface, and being elastically deformable from a relaxed position to an expanded position;

engagement means formed on opposing portions of the body for engaging at least a portion of the control component when the body is in the relaxed position to secure the control component to the body, said engagement means at least partially disengaging the control component in the expanded position to allow the control component and the body to be separated; and mounting means for securing the body to the motor housing so that the top surface of the body is positioned adjacent an inner surface of the housing so as to prevent the body from being deformed to the expanded position.

9. The bracket of claim 8, wherein the mounting means includes at least one flange mounted to the top surface of the body, said flange engaging a slot formed in the housing of the motor.

10. The bracket of claim 9, wherein the flange is integrally molded with the body.

11. The bracket of claim 8, wherein said engagement means extend in parallel relation to one another from the bottom surface of the body.

12. The bracket of claim 11, wherein said engagement means are integrally molded with the body.

13. The bracket of claim 11, wherein each engagement means has an interior surface which faces the component, art exterior surface which faces the housing, and a plurality of offset tabs extending orthogonally from the interior surface to define a space into which a portion of the control component fits.

14. The bracket of claim 13, wherein the tabs are diagonally offset.

15. The bracket of claim 13, wherein the engagement means further comprises a support that extends from each of the interior surfaces to limit movement of the control component in at least one direction while in the bracket.

16. The bracket of claim 8, further comprising gussets between the engagement means and the bottom surface of the body to reduce motion of the control component when mounted within the bracket.

17. The bracket of claim 16, wherein the gussets are integrally molded with the body.

18. The bracket of claim 8, further comprising gussets between the engagement means and opposing portions of the body to provide strength to the points where said engagement means are attached to said body.

19. The bracket of claim 18, wherein the gussets are integrally molded with the body.

20. The bracket of claim 8, further comprising gussets formed on an exterior surface of the engagement means to provide strength thereto when engaging at least a portion of the control component.

21. The bracket of claim 20, wherein the gussets are integrally molded with the body.

22. A bracket for mounting a control component in a motor housing, comprising:
   a resilient, arcuately-shaped, one-piece body, having a top surface and a bottom surface, the body being elastically deformable between a first position and a second position;
   a flange disposed on the top surface of the body for engaging a slot formed in the housing of the motor to secure the body to the motor housing so that the top surface of said body is positioned adjacent an inner surface of the housing; and engagement structure formed on opposing portions of the body and extending from the bottom surface thereof, said engagement structure having interior and exterior surfaces, the interior surface having diagonally offset tabs that orthogonally extend therefrom to form spaces into which portions of the control component fit.

23. The bracket of claim 22, wherein the top surface of the body interacts with the inner surface of the housing to insure that the body remains in the first position when the bracket is mounted within the motor housing to prevent separation of the control component therefrom, thereby locking the component in said bracket.

24. The bracket of claim 22, wherein said body, said flange and said engagement structure are integrally molded to the body from a thermoplastic material.

25. A bracket for mounting a control component in a motor housing, comprising:

a one-piece resilient body, having top and bottom surfaces and being elastically deformable from a relaxed position to an expanded position;

means on the body for engaging the control component when the body is in the relaxed position to secure the control component to the body, said means at least partially disengaging the component in the expanded position to allow the component and the body to be separated; and means for mounting the body to the motor housing such that the top surface of the body is disposed adjacent and interacts with an inner surface of the housing to prevent deformation of the body from the relaxed position to the expanded position, thereby locking the component to the bracket.

26. The bracket of claim 25, wherein at least one integrally molded gusset extends between the body and the engagement means so as to provide strength to the bracket to prevent the control component mounted therein from wobbling.

27. The bracket of claim 25, wherein the engagement means is disposed on opposing portions of the body.

28. The bracket of claim 27, wherein the engagement means includes laterally spaced tabs that define spaces into which portions of the control component are positioned to lie.

29. The bracket of claim 28, wherein the laterally spaced tabs are diagonally offset.

30. A bracket for mounting a control component within a housing of a motor, comprising:

a one-piece, arcuate body movable between a relaxed position and an expanded position, and having a top surface, a bottom surface, opposing ends, and a curvature of less than one hundred eighty degrees;

means on opposing ends of the body for engaging the control component when the body is in the relaxed position to couple the control component to the body and at least partially disengaging the control component in the expanded position to allow the control component and the body to be separated; and means for mounting the body to the motor housing so that the top surface of the body is positioned adjacent an inner surface of the housing to lock the body in the relaxed position and, in conjunction with the engaging means, properly position and fix the control component within the motor housing adjacent an assembly of the motor.

31. The bracket of claim 30, wherein the engaging means includes a wall coupled to each of the opposing ends and extending away from the bottom surface of the body and a pair of tabs coupled to an inner surface of each wall that define a space in which a portion of the control component is positioned to lie.

32. The bracket of claim 30, wherein the mounting means includes a flange coupled to and extending from the top surface of the body that engages a slot formed in the housing.

33. The bracket of claim 30, wherein the top surface of the body and the inner surface of the housing have substantially equal radii of curvature.

* * * * *